United States Patent [19]

Soutome et al.

[11] Patent Number: 5,625,782
[45] Date of Patent: Apr. 29, 1997

[54] DIFFERENTLY MAGNIFIED INTERLOCKED WINDOWS WITH AUTOMATIC SCROLLING

[75] Inventors: Hiroshi Soutome; Youichi Kawakami; Hiroshi Kato, all of Hitachi, Japan

[73] Assignees: Hitachi, Ltd., Tokyo; Hitachi Taga Engineering Ltd., Ibaraki, both of Japan

[21] Appl. No.: 347,094

[22] Filed: Nov. 23, 1994

[30] Foreign Application Priority Data

Nov. 25, 1993 [JP] Japan .................................. 5-294923

[51] Int. Cl.⁶ .................................................. G06F 3/00
[52] U.S. Cl. .......................................... 395/341; 395/139
[58] Field of Search ................................ 395/139, 157, 395/158, 155–156, 159–161; 345/119–120, 123, 127–131

[56] References Cited

U.S. PATENT DOCUMENTS

| | | | |
|---|---|---|---|
| 4,533,910 | 8/1985 | Sukonick et al. | 395/157 |
| 4,574,364 | 3/1986 | Tabata et al. | 395/157 |
| 4,688,167 | 8/1987 | Agarwal | 395/157 |
| 4,751,507 | 6/1988 | Hama et al. | 395/157 |
| 4,823,303 | 4/1989 | Terasawa | 395/157 |
| 4,829,294 | 5/1989 | Iwami et al. | 395/157 |
| 4,982,345 | 1/1991 | Callahan et al. | 395/157 |
| 5,001,697 | 3/1991 | Toms | 395/157 |
| 5,073,771 | 12/1991 | Satta et al. | 395/139 |
| 5,187,776 | 2/1993 | Yanker et al. | 395/157 |
| 5,341,466 | 8/1994 | Perlin et al. | 395/139 |
| 5,438,662 | 8/1995 | Randall | 395/161 |
| 5,485,174 | 1/1996 | Henshaw et al. | 395/123 |

FOREIGN PATENT DOCUMENTS 4-270384  9/1992  Japan .................................. G06F 3/14

*Primary Examiner*—Mark R. Powell
*Assistant Examiner*—John E. Breene
*Attorney, Agent, or Firm*—Evenson, McKeown, Edwards & Lenahan, P.L.L.C.

[57] ABSTRACT

In a case of a document preparation using a reduced picture, since a position indicated by a pointing device is displayed always on an enlarged display window, the scrolling operation of the window for carrying out an enlarged display is reduced. When a part of a document displayed reduced on a "window 1" is indicated by a pointing device, at an indicated position a cursor of the "window 1" is made to move automatically. A cursor of a "window 2" is made to move by working together of the movement of the cursor of the "window 1". At that time, in a case in which the cursor position is not displayed on the "window 2", the cursor display position in the "window" is scrolled automatically. Since the cursor display position in the "window" is scrolled automatically, it is unnecessary to perform the scrolling operation of the "window 2". In a case of a document preparation using a reduced picture, the scrolling operation of the "window 2" for carrying out an enlarged display is reduced.

12 Claims, 6 Drawing Sheets

INITIAL DISPLAY

MOUSE DESIGNATION FIGURE

FIG. 1
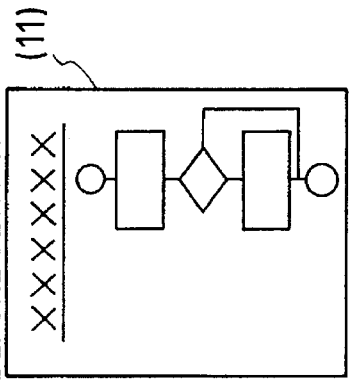
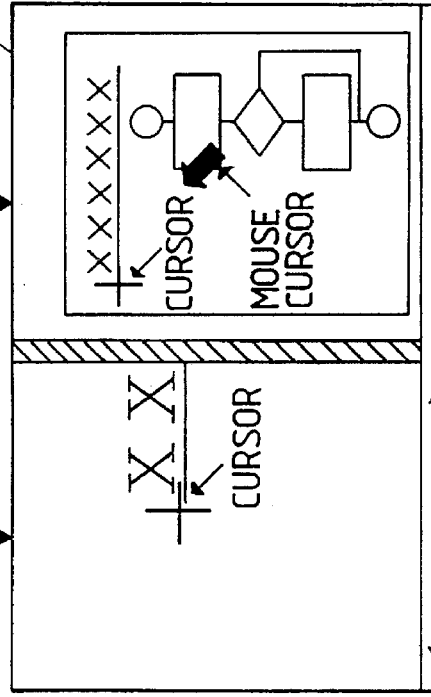
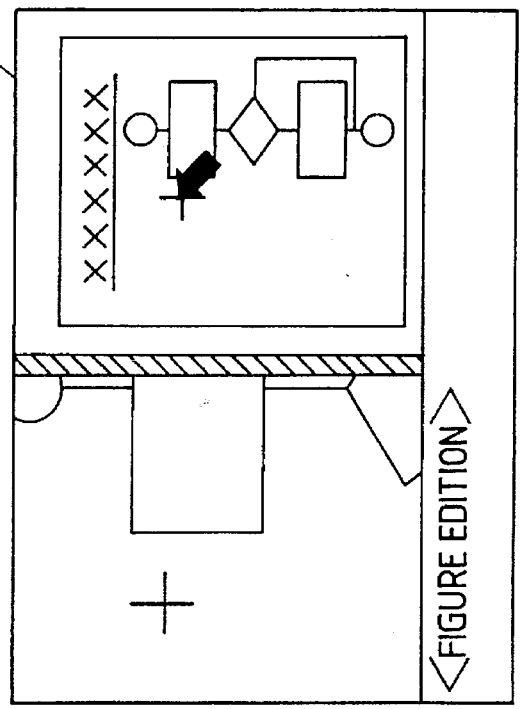

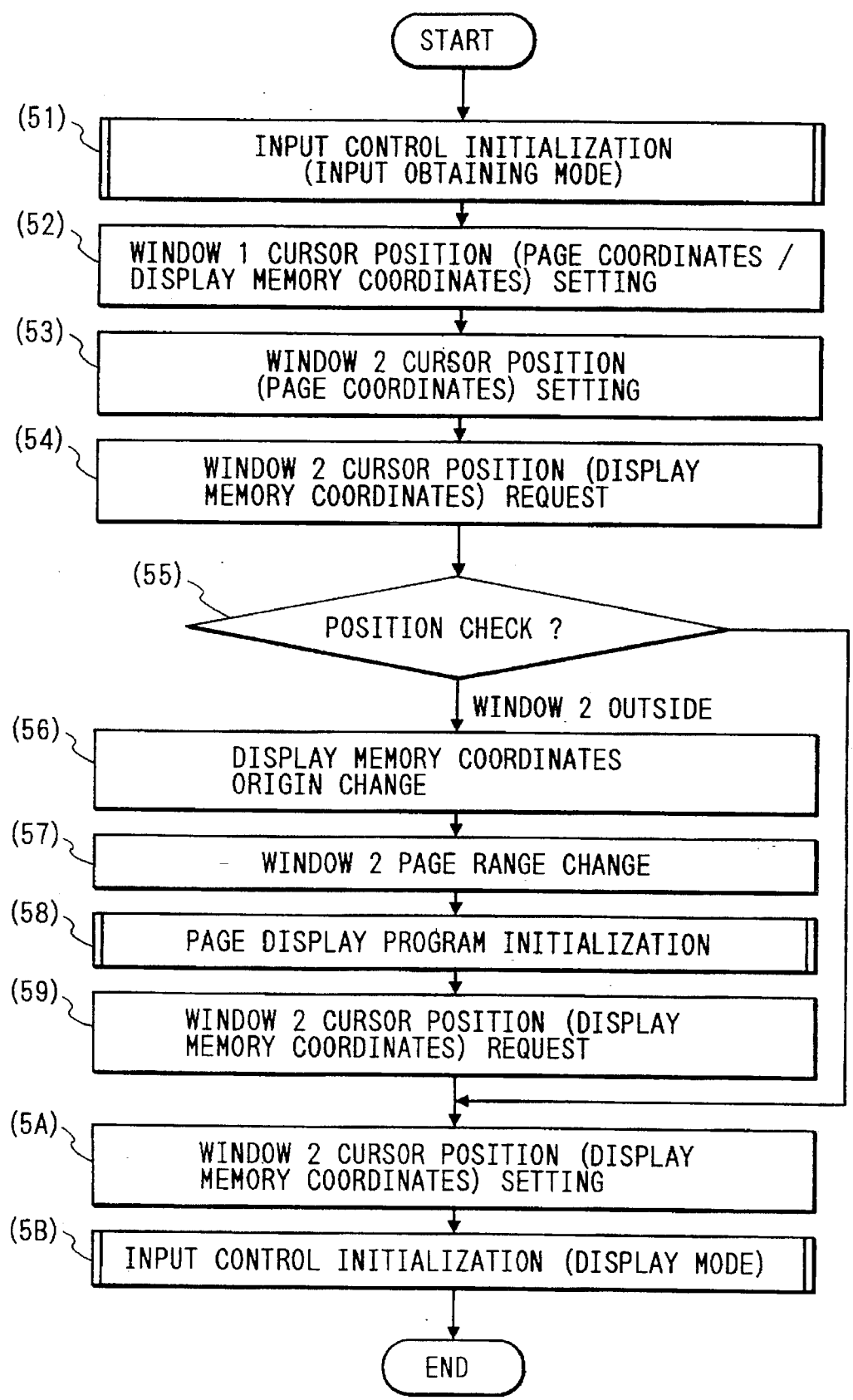

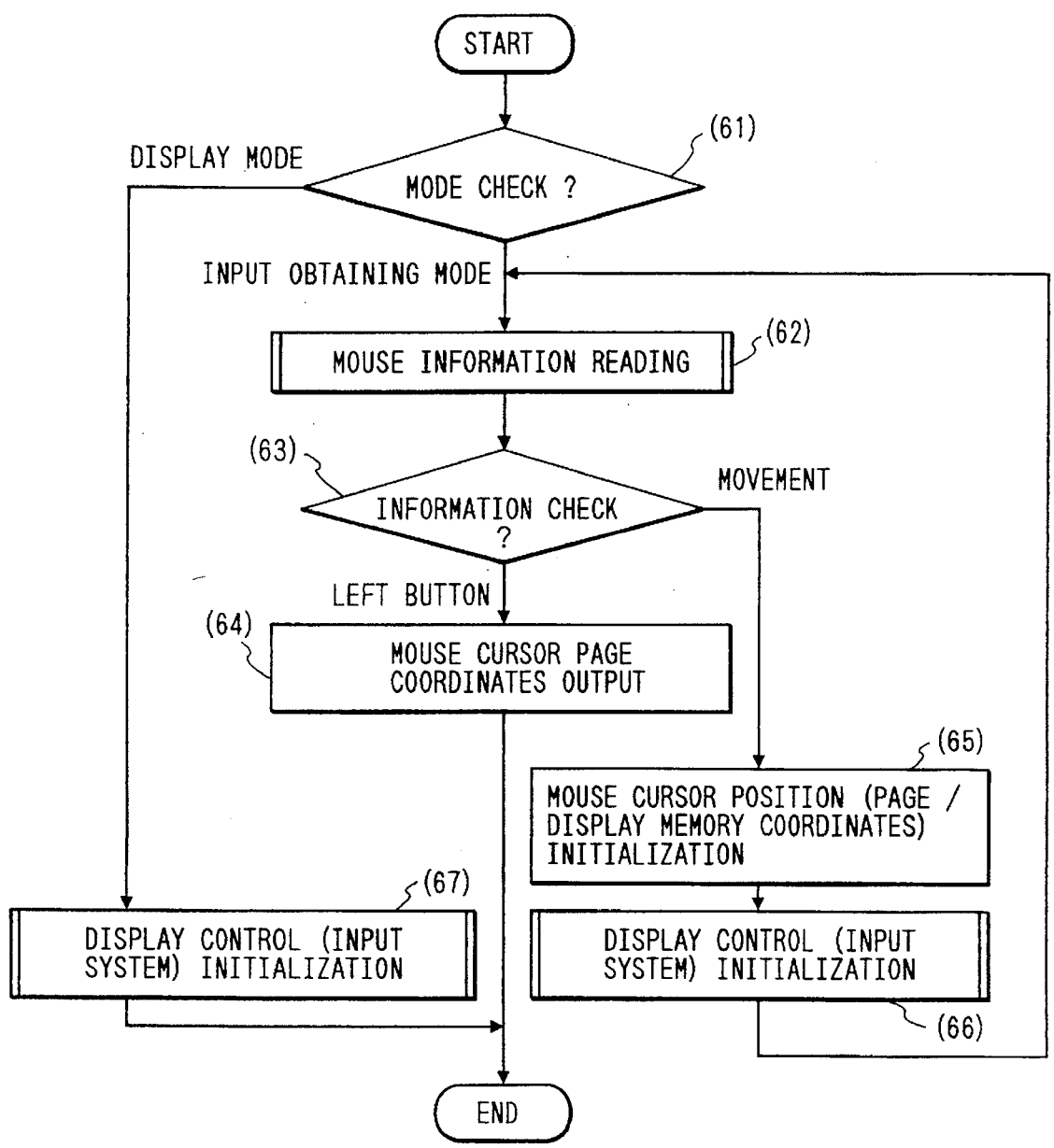

DIFFERENTLY MAGNIFIED INTERLOCKED WINDOWS WITH AUTOMATIC SCROLLING

BACKGROUND OF THE INVENTION

1. Field of the Invention

The present invention relates to an information display method and an information processing apparatus for preparing a document.

2. Prior Art

In a conventional information processing apparatus, the apparatus has an edition environment for displaying enlarged characters/figures in an edition picture during the editing of an edition. This edition environment displays two windows (hereinafter referred to as "window 1" and "window 2") on a display apparatus. On these windows, the same characters/figures are displayed respectively with a different display magnification rate.

Using the above edition environment, the user can practice effectively editing the edition of the character or the figure. For example, when the user prepares the character or the figure in the document, the user can practice displaying an entire page, reduced in size, in the "window 1" and, confirming a positional relationship in the page, the user can prepare the character or the figure in the "window 2".

In the above conventional information processing apparatus, during the preparation of the character or the figure, since the positional relationship in the page is clearly made, accordingly, the working efficiency of the user can be improved.

In using the above-described edition environment in the above conventional information processing apparatus, the following problems arise in the operation of the information processing apparatus.

Because plural windows are displayed on the picture of the display apparatus, the contents which are able to be displayed in one window are made small. In the above-described edition environment, it is necessary to display the contents of an entire page on the "window 1", so that the display content for the "window 2" has a narrow range.

As a result, it is disadvantageous that the user must make frequent scrolling operations when operating on "window 2".

When the user prepares the document using the above-described edition environment, in general the following handling method is used: namely, using the "window 1", the position in the page is roughly confirmed; next, the position is displayed on the "window 2"; then, after the preparation of the character and the figure using the "window 2", the layout in the page is confirmed by the "window 1".

In the above-described operation, at the step in which "the position is displayed on the "window 2"", the scrolling operations occur at the "window 2".

Further, the user must always watch which portion of the "window 1" is displayed on the "window 2". In some cases, the user makes an error in the edition by misunderstanding the above-described relationship.

To solve the above-mentioned problems, a system is proposed in, for example, Japanese patent laid-open publication No. 270384/1992. In the system shown in the above publication, a rectangular body showing the display position of the "window 2" is displayed on the "window 1". By moving this rectangular body, the contents of the "window 2" are scrolled in conjunction with movement of the rectangular body.

In this system, because the positional relationship of the enlarged displayed portion is confirmed on the reduced picture, it is considered that the last described problem of the above-mentioned problems can be overcome.

However, some range of the "window 1" is displayed on the "window 2", such that it is necessary to practice the scrolling operation so as to move the rectangular body.

The problem to be solved by the present invention, therefore, resides in that the position of the "window 1" which displays a reduced version of the whole one page, or the whole edition region, is indicated by a pointing device such as a mouse, so as to display such an indicated position on the "window 2" in which the enlarged display is performed. Thereby, it is possible to automatically scroll the contents of the "window 2".

SUMMARY OF THE INVENTION

An object of the present invention is to provide an information display method and an information processing apparatus wherein for a document preparation using a reduced picture, a position indicated by a pointing device is always displayed on an enlarged display window, thereby scrolling operations of the enlarged display window can be reduced.

Another object of the present invention is to provide an information display method and an information processing apparatus wherein when a "window 1" for displaying a reduced version of either an entire page or an entire edition area is indicated by a pointing device such as a mouse, so as to display such an indicated position on a "window 2" for performing an enlarged display, a content of the "window 2" being scrollable.

According to the present invention, an information display method is provided in which the same display data are displayed on at least two windows having different display magnification rates for the display pictures, and the display pictures of the at least two windows are interlock displayed. When a predetermined position of a first window having a smaller display magnification rate is indicated by a pointing device, a first cursor of the first window having the smaller display magnification rate is displayed at the predetermined position.

When a predetermined position indicated by the first cursor on the first window having the smaller magnification rate is not displayed on the window having the larger magnification rate, so as to appear as the predetermined position indicated by the first cursor in a second window having a larger display magnification rate, the display picture of the second window having the larger display magnification rate is automatically scrolled. On the second window having the larger display magnification rate, a second cursor is displayed at a position which coincides to the first cursor displayed on the first window having the smaller display magnification rate.

Further, according to the present invention, an information processing apparatus includes a display apparatus, a keyboard, a pointing device, a memory apparatus, and a control processor for controlling the above-described apparatuses.

In the information processing apparatus, a first window and a second window are displayed in a non-overlapping manner on a screen of the display apparatus. On the first window, either an entire page or an entire region area arranged on a page is displayed having an actual or reduced size. On the second window, a portion of the contents displayed on the first window is displayed with an actual or enlarged size. From either the first window or the second window, the input/editing is carried on. The first window and the second window have reversely displayed an edition of a result of the first window and a result of the second window. On each of the first window and the second window, a first cursor and a second cursor, each of which is operated by a specific key of the keyboard, are displayed. The first cursor of the first window and the second cursor of the second window are operated together by the specific key. When the second cursor of the second window goes out from the second window, so as to display the second cursor on the second window, the second cursor is automatically scrolled.

When part of a reduced displayed document on the first window is indicated by the pointing device, the first cursor of the first window is automatically moved to an indicated position and the second cursor of the second window is moved by operating in conjunction with the movement of the first cursor of the first window, and when the second cursor position is not displayed on the second window, so as to display the indicated position on the second window, a display position of the second window is automatically scrolled. In the case of preparing a document using a reduced picture, a position indicated by the pointing device is always displayed on the enlarged indication second window.

The plural windows are displayed on the screen of the display apparatus through a window display system for displaying plural windows on the screen of the display apparatus. The character, figure, etc. is displayed in an enlarged or reduced form in the window through the display apparatus in which the character or the figure is displayed by varying the display magnification rate.

Further, the display system displays the same contents (the character or the figure, etc.) in the related window depending on plural windows. The display system displays the same contents by working in conjunction with the related window. The character or the figure is edited by some window within the above-stated related window.

Using plural above-described display systems, the "window 1" for displaying in reduced form the whole one page and the "window 2" for displaying in enlarged form a part of the document displayed on the "window 1" are displayed on the screen of the display apparatus, and the editing result of the "window 1" is carried out to interlock-displaying on the "window 2". The reverse is also true.

The cursor display displays the cursor which operates on the window by working together according to a specific key on the keyboard. The scrolling system automatically scrolls the contents of the "window 2" so as to display the cursor, when the cursor exists outside of the "window 2".

Using the cursor display and the scrolling system, the cursor of "window 1" and the cursor of "window 2" are always arranged at the same position on the page. In other words, when by a key indication the cursor of "window 1" is moved at a right upper corner of the page, the right upper corner is displayed on the "window 2" and the cursor is arranged at that right upper corner.

Further, when the user indicates the "window 1" by the pointing device, using the cursor movement system for moving the cursor, the user can indicate the part of the document being displayed reduced of the "window 1" by the pointing device. In this time, the cursor of "window 1" is made to move automatically. By working together with this movement, the cursor of "window 2" is made to move.

In that time, when the cursor position is not displayed on the "window 2", so as to display that position the display position in the "window 2" is made to scroll automatically.

The edition environment according to the present invention has the following elements.

Two windows including the "window 1" and the "window 2" are displayed on the picture of the display apparatus without the windows overlapping each other. On the "window 1", the entire page or the whole region such as a figure region arranged on the "window 1" is displayed in a reduced size. On the "window 2", the part of the contents displayed on the "window 1" is displayed in an enlarged size.

The input/editing for the character of the figure is carried out on either the "window 1" or the "window 2". The interlock display system displays the editing result of the "window 1" on the "window 2", or the editing result of the "window 2" on the "window 1", that is, the reverse is also true.

Using the above-stated systems, when a user indicates the part of the reduced displayed document of the "window 1" using the pointing device, the cursor is moved automatically to that position and further, working together this movement, the cursor of the "window 2" is also made to move.

In that time, when the cursor position is not displayed on the "window 2", so as to display that position on the "window 2", the display position in the "window 2" is scrolled automatically. Accordingly, it is unnecessary to carry out the problematic scrolling operation which occurs in the conventional technique.

BRIEF DESCRIPTION OF THE DRAWINGS

FIG. 1 is an illustrative operational explanation view showing one embodiment of an information processing apparatus according to the present invention;

FIG. 5 is a flow-chart of a picture control showing one embodiment of an information processing apparatus according to the present invention; and FIG. 6 is a flow-chart of an input control showing one embodiment of an information processing apparatus according to the present invention.

DETAILED DESCRIPTION OF THE DRAWINGS

Hereinafter, one embodiment of an information processing apparatus according to the present invention will be explained with reference to the drawings.

Figure 2:
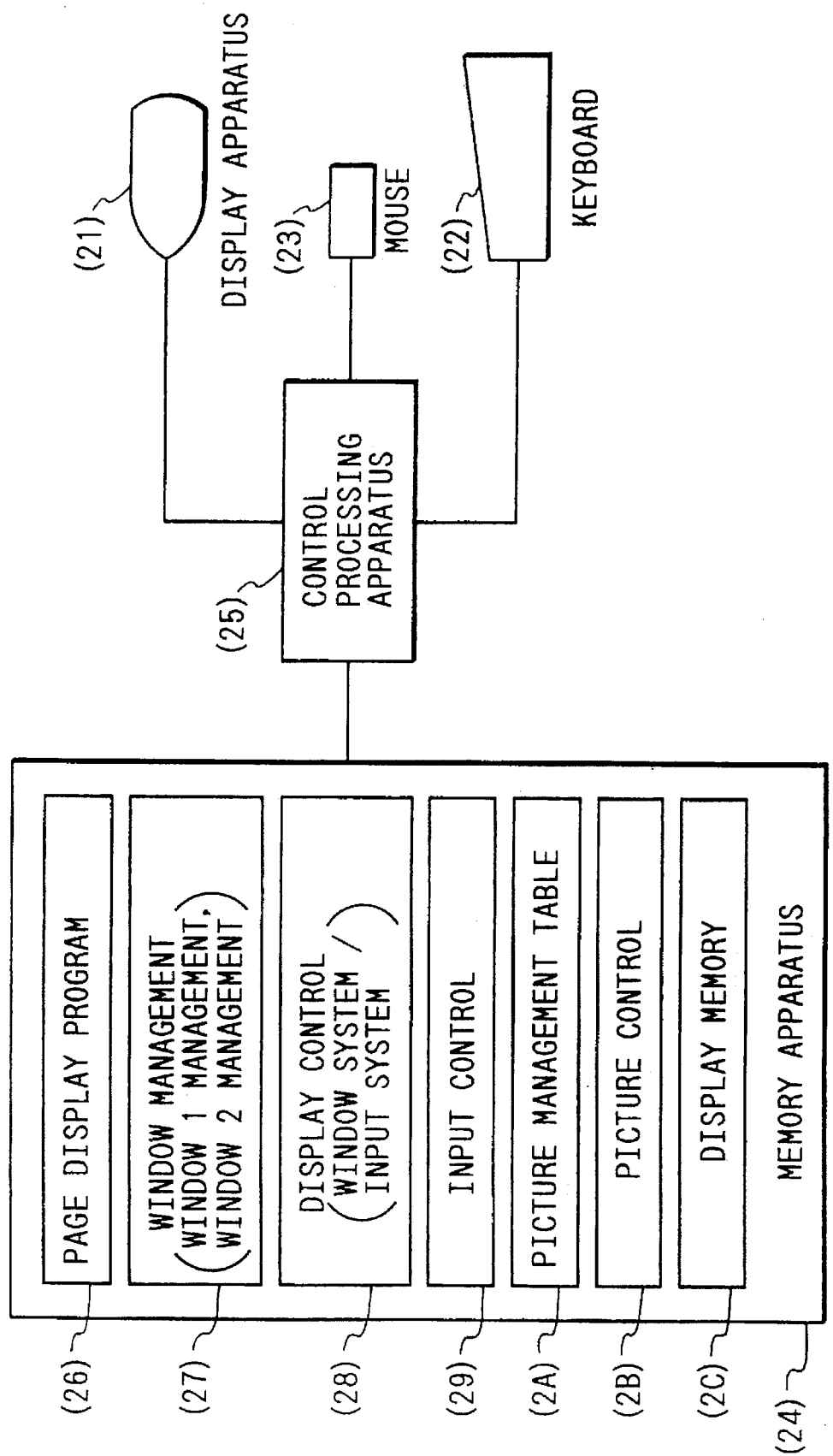
FIG. 2 is a block diagram of the hardware construction showing one embodiment of an information processing apparatus according to the present invention.

A hardware construction of one embodiment of an information processing apparatus according to the present invention will be explained with reference to FIG. 2.

An information processing apparatus according to one embodiment includes a display apparatus (21), a keyboard (22) for indicating an input of a character or an editing function, a mouse (23) for indicating the input of the character or the editing function, a memory apparatus (24) for storing a program, an image data and a character line data, and a control processing apparatus (25) for controlling the above-stated apparatuses.

The mouse (23) used in this embodiment is constituted of a two-button construction having a right button and a left button.

Further, the memory apparatus (24) includes a page display program (26) for displaying some range of a page, a window management system (27) for managing window information, a display control system (28) for describing a character and a figure, an input control system (29) for controlling an input of the mouse (23) and the keyboard (22), a picture management table system (2A) for registering picture information, a picture control system (2B) for controlling a picture display of a scroll etc., and a display system (2C) functioning as a memory necessary to be displayed on the display apparatus (21).

Next, using an illustrative view shown in FIG. 1, the operation of the invention will be explained for a case in which any change is performed with respect to the left side of the flow-chart of a document such as a document (11) (contents of page before editing) shown in FIG. 1.

In the information processing apparatus according to the present invention, after an editing actuation, an initial picture such as a picture (12) (initial display) shown in FIG. 1 is displayed on the display apparatus (21).

This initial picture displays a "window 1" in which the entire page is displayed in a reduced size on the display apparatus (21) and a "window 2" in which a part of the left upper corner is displayed in an enlarged size on the display apparatus (21).

The respective cursor is displayed in each of the two windows comprising the "window 1" and the "window 2". Each of the cursors of "window 1" and "window 2" indicates the same position in the page.

For example, in the case of FIG. 1, a front (head) character position of a heading character line of an upper portion of the page is indicated. Further, separately from the cursor, one mouse cursor is displayed on the display apparatus (21).

The user can move the mouse cursor in the neighborhood of the left side of a first box of the flow-chart and indicates that position by using the left button. In this indication operation, the cursor of "window 1" is made to move to an indication position and further, working together with this cursor movement, the cursor of "window 2" is also made to move.

During this time, so as to display the cursor after the movement in the picture, the "window 2" is automatically scrolled and a condition is presented in which the left side of the first box of the flow-chart is displayed in the "window 2".

On the "window 2" having the above-stated condition, the user can operate an input for a note at a side of the box and a confirmation etc. of a connection condition between the box and a line segment.

The operation example of the information processing apparatus according to this embodiment is stated in the above.

Next, a picture display system of this embodiment will be explained with reference to FIG. 3. The picture display system of this embodiment is performed by the conventional document preparation apparatus, so that a detailed explanation thereof will be omitted in this specification.

Figure 3:
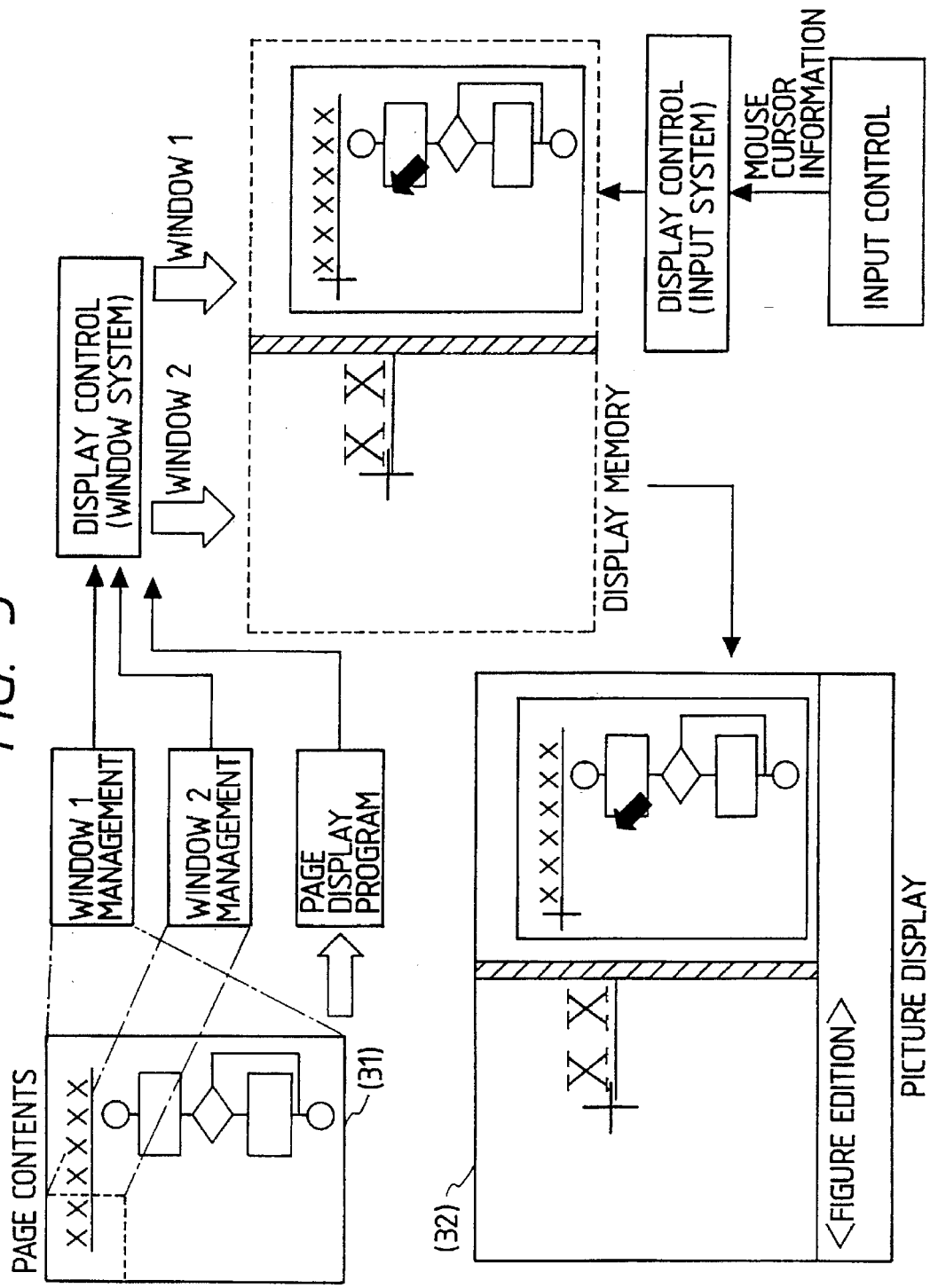
FIG. 3 is a picture display construction view showing one embodiment of an information processing apparatus according to the present invention.

When the page contents (31) (page contents) shown in FIG. 3 are displayed on the display apparatus (21), using "window 1" management and "window 2" management of the window management system (27), the contents (within a range of the page) to be displayed in each of "window 1" and "window 2" are determined.

In the case shown in FIG. 3, "window 1" has a display content comprising the entire page, beside which the "window 2" has a display content comprising a range surrounded by dotted lines at the left corner of the page. The above-stated dotted line surrounded range is the range to be displayed when the character or the figure is displayed with the same size as a printed result on the display memory system for displaying the "window 2".

During this time, the range for "window 2" for displaying the display memory system is fixed. However, it is possible to make it variable according to the size of "window 1".

In the above processing, after the display range on the page is determined, the "window 1" management system determines a display magnification rate for "window 1" from the above-stated display range of the page and the display range of the display memory system.

The "window 2" displays the character or the figure at the same size as the printed result, so that the display magnification rate of "window 2" is fixed as 1.

After the above-stated display range on the page and the display magnification of each of "window 1" and "window 2" are determined, the processing of the "window 1" management and the processing of the "window 2" management is completed.

Next, a page display program for displaying the character or the figure existing within some range of the page is actuated. This program removes character data or figure data from the document data of the page and notices these datum to the display control system (the window system).

However, the document data, the character data and the figure data are the same types of data which are dealt with in the ordinary information processing apparatus, so that a detailed explanation will be omitted from this specification.

The display control system (the window system) writes the contents of the "window 1" and the "window 2" into the display memory system under the consideration of the data of the above-stated noticed character, etc. and the above-stated display magnification rate.

After the above-stated processing has completed processing the data on the page, the page display program processing is completed.

The system for write-in processing of the character etc. to the display memory system is the same type of system dealt with in the ordinary information processing apparatus, so that a detailed explanation will be omitted from this specification. Further, the display control system (the window system) performs write-in processing of the document such as the character or figure.

Next, the input control for managing the position information of the cursor or the mouse cursor is actuated. Herein, the position (the coordinate) of the cursor or the mouse cursor on the page and the position on the display memory (the coordinate of the origin point beginning from the left corner of the display memory) are managed.

In order to display the initial picture shown in the picture display (32), the coordinate on the display memory of the cursor and the mouse cursor of each of "window 1" and "window 2", and the form information of the cursor and the mouse cursor of each of "window 1" and "window 2" are provided to the display control (the input system). The display control (the input system) carries out the write-in processing except for the document data of the cursor and the mouse cursor etc..

After the completion of the above-stated processing, the processing of the input control is completed. After that, the display memory is output on the display apparatus, thereby the picture display (32) is presented. In the process of the above-stated control, the management table for managing the picture information and the cursor information is prepared. The preparation process of the management table will be explained with reference to FIG. 3 and FIG. 4.

In the "window 1" management and the "window 2" management shown in FIG. 3, the display range of the page contents and display magnification rate and the display range of the display memory are determined. The display range of the page contents is determined by using the page coordinate (41) and the display range of the display memory is determined by using the display memory coordinate (42).

Figure 4:
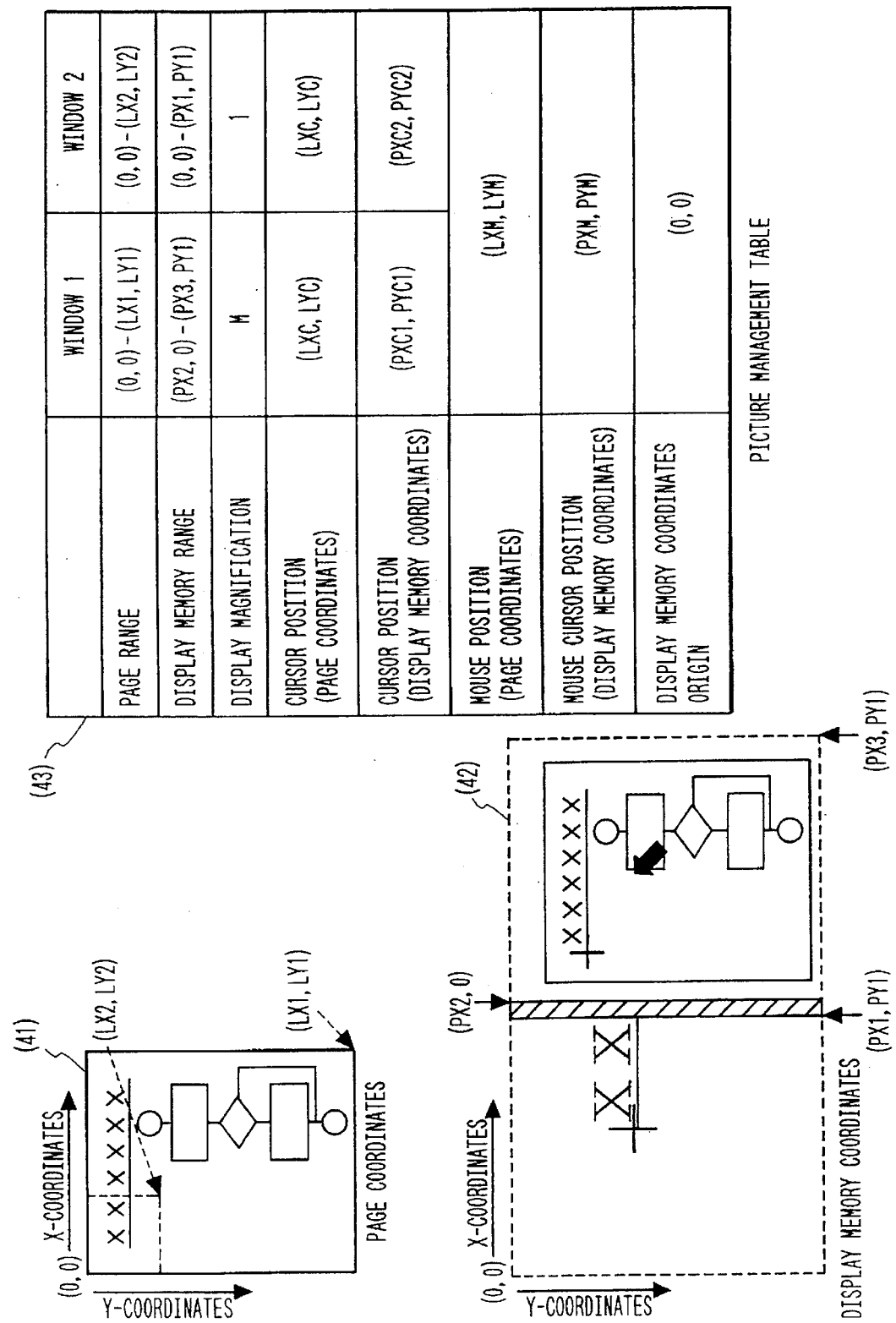
FIG. 4 is an illustrative view of a picture management table showing one embodiment of an information processing apparatus according to the present invention.

The determined information is set at the page range of the picture management table (43) and the display memory range and the display magnification shown in FIG. 4. For the case shown in FIG. 4, the page range of the "window 1" is set to (0, 0)–(LX1, LY1), the page range of the "window 2" is set to (0, 0)–(LX2, LY2), the display memory range of the "window 1" is set to (PX2, 0)–(PX3, PY3), the display memory range of the "window 2" is set to (0, 0)–(PX1, PY1), the display magnification rate of the "window 1" is set to M, and the display magnification of the "window 2" is set to 1.

The display magnification of "window 1" is determined by a ratio between the page size to be displayed and the display memory size of the "window 2". For the case shown in FIG. 4, (i) (PX3–PX2) / LX1 and (ii) PY2 / PY1 are requested, and the display magnification rate M of "window 1" is set to a smaller value within (i) and (ii).

Further, the input control for managing the position information of the cursor and the mouse cursor sets the cursor position (the page coordinate / the display memory coordinate) of the picture management table (43) and the position (the page coordinate / the display memory coordinate) of the mouse cursor and the coordinate origin point of the display memory.

The coordinate origin point of the display memory shows the position of the page coordinate for display of the position (0, 0) of the display memory coordinate. Hereinafter, the case shown in FIG. 4 will be explained.

In order to display the head position (the position of the page coordinate (0, 0)) of the page on "window 2", the coordinate origin point of the display memory is (0, 0). With respect to the cursor position (the page coordinate), the "window 1" is (LXC, LYC) and also the "window 2" is (LXC, LYC). The coordinates of "window 1" and "window 2" have the same coordinate. With respect to the cursor position (the display memory coordinate), the "window 1" is (PXC1, PYC1) and also the "window 2" is (PXC2, PYC2).

Since the mouse cursor provides only one display on the display apparatus, the picture management table manages in common with the "window 1" and the "window 2". The mouse cursor (the page coordinate) becomes (LXM, LYM). The mouse cursor (the display memory coordinate) becomes (PXM, PYM). The display memory coordinate is requested by subtracting the display memory origin point from the page coordinate and further by multiplying the subtracted value by the display magnification rate.

In this embodiment according the present invention, it can be realized by the picture control (2B) for controlling the above-stated picture management table (43) (2A), the display control (28) and the input control (29).

Next, the processing of the picture control (2B) will be explained using a flow-chart shown in FIG. 5.

Item (51) processing

The picture control is actuated by the input obtaining mode to the input control. The input control outputs the page coordinate value of the mouse cursor when the left button of the mouse is pressed down.

Item (52) processing

The cursor position (the page coordinate) and the cursor position (the display memory coordinate) of "window 1" are altered. Since "window 1" displays the entire page, without scrolling it is possible to move the cursor at the page coordinate obtained by the above.

Accordingly, for the cursor position (the page coordinate) of "window 1", by using the information output from the input control, the cursor position (the display memory coordinate) is the X-coordinate (=PX2+the cursor position (X-coordinate of the page coordinate))×M, and the Y-coordinate (=the cursor position (Y-coordinate of the page coordinate))×M.

Item (53) processing

The cursor position (the page coordinate) of "window 2" on the picture management table is set. Since in this embodiment, the cursor position (the page coordinate) between "window 1" and "window 2" is made to coincide, the cursor position (the page coordinate) of "window 2" is the cursor position (the page coordinate) of "window 1".

Item (54) processing

From the cursor position (the page coordinate) of the above "window 2", the cursor position (the display memory coordinate) of the above "window 2" is requested.

The cursor position (the display memory coordinate) has X-coordinate (=the cursor position (X-coordinate of the page coordinate))–X-coordinate of the display memory coordinate origin point, and has Y-coordinate (=the cursor position (Y-coordinate of the page coordinate))–Y-coordinate of the display memory coordinate origin point.

Item (55 processing

The cursor position (the display memory coordinate) of "window 2" requested by the above is checked whether or not it is included in the display memory range of "window 2", in this embodiment, (0, 0)–(PX1, PY1)).

In a case of inclusion of the display memory range of "window 2", it shows that the cursor can be set on the "window 2". Besides, in a case of exclusion of on "window 2" the display memory range of "window 2", it shows that the cursor cannot be set on "window 2" unless the contents of "window 2" are scrolled.

Item (5A) processing

When the display memory range of "window 2" is included, since it is unnecessary to carry out the scrolling processing, it carries out the movement for the cursor. The cursor position (the display memory coordinate) requested by the previous processing is set at the cursor position (the display memory coordinate) on the picture management table of "window 2".

Item (5B) processing

According to the actuation of the input control by the display mode, the cursor of "window 1" and the cursor of "window 2" are displayed in their moved positions.

When the cursor position (the display memory coordinate) of "window 2" is not included in the display memory range of "window 2", after the scrolling processing of "window 2" has been performed, the movement processing of the cursor is carried out. The scrolling processing realized by following three processing steps.

Item (56) processing

The display memory coordinate origin point is altered. There are various kinds of alteration systems according to the set position conditions, for example, after the scrolling the cursor sets itself at a center of the window, an upper portion of the center, or the lower portion of the center of "window 2". In this embodiment, the alternation system employs a system in which the cursor is set at the center of the "window 2".

In this system, at the positions of X=PX1/2 and Y=PY1/2 of the display memory coordinate, X=the cursor position (X-coordinate of the page coordinate) of "window 2" and Y=the cursor position (Y-coordinate of the page coordinate) of "window 2" are displayed. Further, since the display magnification rate of "window 2" is 1, the display memory coordinate origin point is requested by the following calculation formula.

X=the cursor position (X-coordinate of the page coordinate) of "window 2"−(PX1/2)

Y=the cursor position (Y-coordinate of the page coordinate) of "window 2"−(PY1/2)

The values obtained are set as the display memory coordinate origin point of the picture management table.

Item (57) processing

Since it generates the alteration of the display memory coordinate origin point, the alteration of the page range to be displayed on the "window 2" is carried out.

The left upper corner of the page range of "window 2" is altered to the X-coordinate of the display memory coordinate origin point and the Y-coordinate of the display memory coordinate origin point, and the right lower corner is altered to the X-coordinate of the display memory coordinate origin point+PX1 and the Y-coordinate of the display memory coordinate origin point+PY1. The obtained vales are set as the page range of "window 2" of the picture management table.

Item (58) processing

So as to display the character etc.. within the above-stated range, the page display program is actuated. As a result, the scrolling processing in "window 2" is completed.

Item (59) processing

After the finish of the scrolling processing, the cursor position (the display memory coordinate) is requested again. The cursor position (the display memory coordinate) is requested by the following calculation formula.

X = the cursor position (X-coordinate of the page coordinate)-X-coordinate of the display memory coordinate origin point
Y = the cursor position (Y-coordinate of the page coordinate)-Y-coordinate of the display memory coordinate origin point The obtained values are set to the cursor position (the display memory coordinate) of "window 2" of the picture management table.

After that, the processing steps (5A) and (5B) are carried out and the processing of the picture control is completed.

Next, the processing of the input control (29) will be explained with reference to the flow-chart shown in FIG. 6.

Item (61) processing

The input control carries out the judgment for determining the operation mode, whether or not the system is in the input obtaining mode or the display mode. The input obtaining mode is a mode for outputting the mouse cursor position when the left button of the mouse is indicated. The display mode is a mode for displaying the mouse cursor and the cursor.

Item (2) processing

For the case of the input obtaining mode, by actuating the mouse the information of the mouse is read-on. The mouse information at the time is made to be "the mouse movement" and "the left button indication". In the case of the mouse movement, "the mouse movement identifying signal / the display memory coordinate of the mouse cursor at that time" is obtained. For the case of the left button indication, "the left button indication identification signal / the display memory coordinate of the mouse cursor of that time" is obtained.

Item (63) processing

When the above-stated information is for the case of mouse movement, the movement processing of the mouse cursor is carried out, in the case of the left button indication, the processing for outputting the page coordinate at that time is carried out.

Item (64) processing

The processing for outputting the page coordinate of the mouse cursor in case of the left button indication is carried out. The page coordinate of the mouse cursor becomes the mouse cursor position (the page coordinate) of the picture management table.

Item (65) processing

The movement processing of the mouse cursor is carried out. Herein, the display memory coordinate of the mouse cursor obtained by the step (62) processing is set to the mouse cursor position (the display memory coordinate) of the picture management table. According to that value, the mouse cursor position (the page coordinate) is requested, and the requested position is set to the mouse cursor position (the page coordinate) of the picture management table.

The request manner of the page coordinate obtains the window in which the mouse cursor is positioned from the display memory coordinate of the mouse cursor obtained in the item (62) processing.

In the case of "window 1", it is requested by the following formula.

X-coordinate of the page coordinate of the mouse cursor = (X-coordinate of the display memory coordinate obtained in the item (62) processing − PX2) / M
Y-coordinate of the page coordinate of the mouse cursor = (Y-coordinate of the display memory coordinate obtained in the item (62) processing / M In the case of "window 2", it is requested by the following formula.

X-coordinate of the page coordinate of the mouse cursor=
X-coordinate of the display memory coordinate obtained in the item (62) processing+X-coordinate of the display memory coordinate origin point Y-coordinate of the page coordinate of the mouse cursor=
Y-coordinate of the display memory coordinate obtained in the item (62) processing+Y-coordinate of the display memory coordinate origin point

---

X-coordinate of the page coordinate of the mouse cursor =
X-coordinate of the display memory coordinate obtained in the item (62) processing + X-coordinate of the display memory coordinate origin point
Y-coordinate of the page coordinate of the mouse cursor =
Y-coordinate of the display memory coordinate obtained in the item (62) processing + Y-coordinate of the display memory coordinate origin point

---

Items (66) and (67) processing

In order to display the mouse cursor or the cursor, the input system mode of the display control is actuated. As a result, the mouse cursor and the cursor are displayed on the display apparatus.

However, after display of the mouse cursor, the item (66) processing returns again to the item (62) processing. After the display of the cursor, the item (67) processing completes the input control.

According to the present invention, an information display method in which the same display data are displayed on at least two windows having different display magnification rates on display pictures and the display pictures of the at least two windows are interlockingly displayed, when a predetermined position of a first window having a smaller display magnification rate is indicated by a pointing device, a first cursor of the first window having the smaller display magnification rate is displayed at the predetermined position.

When a predetermined position indicated on the first window having the small magnification rate by the first cursor is not displayed on the window having the large magnification rate, so as to appear at a predetermined position indicated by the first cursor in a second window having a larger display magnification rate, the display picture of the second window having the larger display magnification rate is scrolled automatically, and on the second window having the larger display magnification rate, a second cursor is displayed at a position which coincides to the first cursor displayed on the first window having the smaller display magnification rate.

In the above-stated editing environment, when a part of a reduced sized displayed document of the first window is indicated by the pointing device, the cursor of the first window is moved automatically to the indicated position and the cursor of the second window is moved by working together with the movement of the cursor of the first window. In order to display the indicated position on the second window, the display position of the second window is scrolled automatically, thereby it is unnecessary to perform a scrolling operation which is the problem in the prior technique. As a result, in the case of the document preparation using a reduced size picture, the scrolling operation of the second window for performing the enlarged display can be reduced.

According to the present invention, in the information processing apparatus in which "window 1" and "window 2" are displayed without overlapping each other on the picture of the display apparatus, on "window 1", either an entire page or an entire region area, such as the figure area arranged on the page, is displayed with its actual or reduced size, on "window 2", a part of the content displayed on "window 1" is displayed with the actual size or enlarged, from either the "window 1" or the "window 2", the input/editing of the figure or the character is carried on, either the "window 1" or the "window 2" has the editing so as to interlockingly display reversibly the result of "window 1" or the result of "window 2", on each of "window 1" and "window 2".

In the above-stated editing environment, when a part of a reduced displayed document of "window 1" is indicated by the pointing device, the cursor of "window 1" is moved automatically to the indicated position and the cursor of "window 2" is moved by working together with the movement of the cursor of "window 1", and so as to display the indicated position on "window 2", the display position of "window 2" is scrolled automatically, thereby it is unnecessary to perform the scrolling operation which is the problem in the prior technique. As a result, in the case of the document preparation using a reduced picture, thereby the scrolling operation of "window 2" for performing the enlarged display can be reduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for displaying information in which same display data are displayed on at least two windows having different display magnification rates on display pictures, and said display pictures of said at least two windows are interlockingly displayed, the method comprising the steps of:

when a predetermined pointing device operated cursor position of a first window having a smaller display magnification rate is indicated by a pointing device, displaying a first pointing device operated cursor of said first window having said smaller display magnification rate at said predetermined pointing device operated cursor position from a first original pointing device cursor position in said first window;

in order for said predetermined pointing device operated cursor position indicated by said first pointing device operated cursor to appear in a second window having a larger display magnification rate, automatically scrolling said display picture of said second window having said larger display magnification rate;

said first pointing device operated cursor of said first window and a second pointing device operated cursor of said second window are worked together by said pointing device; and on said second window having said larger display magnification rate, displaying said second pointing device operated cursor at a position which coincides to said first pointing device operated cursor displayed on said first window having said smaller display magnification rate from a second original pointing device cursor position in said second window.

2. An information display method according to claim 1, wherein said method further comprises the step of performing preparation processing for preparation of a management table for managing a picture information and a cursor information.

3. An information display method according to claim 1, wherein said pointing device is a mouse.

4. A method for displaying information in which same display data are displayed on at least two windows having different display magnification rates on display pictures, and said display pictures of said at least two windows are interlockingly displayed, the method comprising the steps of:

when a predetermined position of a first window having a smaller display magnification rate is indicated by a pointing device, displaying a first cursor of said first window having said smaller display magnification rate at said predetermined position;

in order for said predetermined position indicated by said first cursor to appear in a second window having a larger display magnification rate, automatically scrolling said display picture of said second window having said larger display magnification rate;

on said second window having said larger display magnification rate, displaying a second cursor at a position which coincides to said first cursor displayed on said first window having said smaller display magnification rate; and performing preparation processing for preparation of a management table for managing a picture information and a cursor information;

wherein said management table comprises a first window management table and a second window management table, the method further comprising the steps of:

determining with said first window management table a display range of a page content, a display magnification rate, and a display range of a display memory; and determining with said second window management table a display range of a page content, a display magnification rate, and a display range of a display memory.

5. An information display method according to claim 4, wherein the display range of the page content of said first management table employs a page coordinate, and the display range of said display memory of said first management table employs a display memory coordinate; and the display range of the page content of said second management table employs a page coordinate, and the display range of said display memory of said second management table employs a display memory coordinate.

6. An information processing apparatus, comprising:

a display apparatus;

a keyboard;

a pointing device;

a memory apparatus; and a control processor for controlling said display apparatus, keyboard, pointing device, and memory apparatus;

wherein in the information processing apparatus:

a first window and a second window are displayed without overlapping each other on a picture of said display apparatus, on said first window at least one of an entire page and an entire region area arranged on a page is displayed with an actual size or a reduced size, on said second window a part of a content displayed on said first window is displayed with an actual size or an enlarged size, from either said first window or said second window, an input/editing function is carried on, said first window and said second window have reversely an edition of a result of said first window and a result of said second window, on said first window and said second window, a first keyboard operated cursor and a second keyboard operated cursor, each of which is operated by a specific key of said keyboard, are displayed respectively, said first keyboard operated cursor of said first window and said second keyboard operated cursor of said second window are worked together by said specific key, when said second Keyboard operated cursor of said second window disappears from said second window, so as to display said second keyboard operated cursor of said second window, said second keyboard operated cursor of said second window is scrolled automatically; and wherein when a part of a reduced displayed document of said first window is indicated by said pointing device, a first pointing device operated cursor of said first window is moved automatically to an indicated pointing device operated cursor position from a first original pointing device cursor position and a second pointed device operated cursor of said second window is moved by working together with said movement of said first pointing device operated cursor of said first window from a second original pointing device cursor position, said first pointing device operated cursor of said first window and said second pointing device operated cursor of said second window are worked together by said pointing device, and so as to display said indicated pointing device operated position on said second window, a display position of said second window is scrolled automatically, and in a case of a document preparation using a reduced picture, a pointing device operated cursor position indicated by said pointing device is always displayed on said enlarged indication second window.

7. An information processing apparatus according to claim 6, further comprising:

means for preparation processing for preparation of a management table for managing a picture information and a cursor information.

8. An information display method according to claim 6, wherein said pointing device is a mouse.

9. An information processing apparatus, comprising:

a display apparatus;

a keyboard;

a pointing device;

a memory apparatus; and a control processor for controlling said display apparatus, keyboard, pointing device, and memory apparatus;

wherein in the information processing apparatus:

a first window and a second window are displayed without overlapping each other on a picture of said display apparatus, on said first window at least one of an entire page and an entire region area arranged on a page is displayed with an actual size or a reduced size, on said second window a part of a content displayed on said first window is displayed with an actual size or an enlarged size, from either said first window or said second window, an input/editing function is carried on, said first window and said second window have reversely an edition of a result of said first window and a result of said second window, on said first window and said second window, a first cursor and a second cursor, each of which is operated by a specific key of said keyboard, are displayed, said first cursor of said first window and said second cursor of said second window working together by said specific key, when said second cursor of said second window disappears from said second window, so as to display said second cursor on said second window, said second cursor is scrolled automatically; and wherein when a part of a reduced displayed document of said first window is indicated by said pointing device, said first cursor of said first window is moved automatically to an indicated position and said second cursor of said second window is moved by working together with said movement of said first cursor of said first window, and so as to display said indicated position on said second window, a display position of said second window is scrolled automatically, and in a case of a document preparation using a reduced picture, a position indicated by said pointing device is always displayed on said enlarged indication second window;

means for preparation processing for preparation of a management table for managing a picture information and a cursor information, wherein said management table comprises a first window management table and a second window management table; said first window management table determining a display range of a page content, a display magnification rate, and a display range of a display memory; and said second window management table determining a display range of a page content, a display magnification rate, and a display range of a display memory.

10. An information processing apparatus according to claim 9, wherein the display range of the page content of said first management table employs a page coordinate, and the display range of said display memory of said first management table employs a display memory coordinate; and the display range of the page content of said second management table employs a page coordinate, and the display range of said display memory of said second management table employs a display memory coordinate.

11. An information processing apparatus, comprising:

a display apparatus for displaying a character and a figure;

a keyboard for indicating an input of the character and the figure, and an edition function;

a pointing device such as a mouse;

a memory apparatus for storing a program, an image data and a character line data; and a control processor for controlling said display apparatus, keyboard, pointing device, and memory apparatus;

wherein in the information processing apparatus:

a first window and a second window are displayed without overlapping each other on a picture of said display apparatus, on said first window at least one of an entire page and an entire region area such as a figure area arranged on a page is displayed with an actual size or a reduced size, on said second window a part of a content displayed on said first window is displayed with an actual size or an enlarged size, from either said first window or said second window, an editing of the figure or the character is carried on, either said first window or said second window has an edition so as to interlock-display reversibly a result of said first window or a result of said second window, on each of said first window and said second window, first keyboard operated cursor and a second keyboard operated cursor, each of which is operated by a specific key of said keyboard, are displayed, said first keyboard operated cursor of said first window and said second keyboard operated cursor of said second window are worked together by said specific key, when said second keyboard operated cursor of said second window disappears from said second window, so as to display said second keyboard operated cursor on said second window, said second keyboard operated cursor of said second window is scrolled automatically, and wherein when a part of a reduced displayed document of said first window is indicated by said pointing device, a first pointing device operated cursor of said first window is moved automatically to an indicated pointing device operator cursor position from a first original pointing device cursor position and a second pointing device operated cursor of said second window is moved by working together with said movement of said first pointing device operated cursor of said first window from a second original pointing device cursor position, said first pointing device operated cursor of said first window and said second pointing device operated cursor of said second window are worked together by said pointing device, and so as to display said indicated pointing device operated cursor position on said second window, a display position of said second window is scrolled automatically, and in a case of a document preparation using a reduced picture, a pointing device operator cursor position indicated by said pointing device is always displayed on said enlarged indication second window, thereby a scrolling operation of said second window for performing the enlarged display is reduced.

12. An information display method according to claim 11, wherein said pointing device is a mouse.

* * * * *